United States Statutory Invention Registration [19]

[11] Reg. Number: H887

Venkataraman et al. [43] Published: Feb. 5, 1991

[54] DISPERSION STRENGTHENED TRI-TITANIUM ALUMINUM ALLOY

[75] Inventors: Ganapathy Venkataraman, Trichy, India; Francis H. Froes, Moscow, Id.

[73] Assignee: The United States of America as represented by the Secretary of the Air Force, Washington, D.C.

[21] Appl. No.: 476,074

[22] Filed: Feb. 7, 1990

[51] Int. Cl.[5] ..... C22C 14/00

[52] U.S. Cl. ..... 420/420; 420/417; 420/418

[58] Field of Search ..... 420/418, 419, 420

[56] References Cited

U.S. PATENT DOCUMENTS

| | | | |
|---|---|---|---|
| 2,880,087 | 3/1959 | Jaffee | 420/420 |
| 3,615,378 | 10/1971 | Bomberger, Jr. et al. | 420/420 |
| 4,292,077 | 9/1981 | Blackburn et al. | 420/420 |
| 4,788,035 | 11/1988 | Gigliotti et al. | 420/420 |

FOREIGN PATENT DOCUMENTS 8901052 2/1989 PCT Int'l Appl. .

OTHER PUBLICATIONS

Venketaraman et al., "The Influence of Niobium Addition on Structure and Properties of Rapidly Solidified . . . " Metals Ab #88(9):12-1066.

Sutliff et al., "Rare Earth Oxide Dispersoid Stability and Microstructure Effects in Rapidly Solidified $Ti_3Hl$ and $Ti_3Al$-Nb." Metals Ab. #86(11):12-1463.

*Primary Examiner*—Robert L. Stoll
*Assistant Examiner*—Greg M. Sweet
*Attorney, Agent, or Firm*—Charles E. Bricker; Donald J. Singer

[57] ABSTRACT

A titanium alloy comprising about 15 to 25 atomic percent (a/o) aluminum, about 0.05 to 12 a/o of at least one beta eutectoid stabilizing element and about 4 to 12 a/o of at least one beta isomorphous stabilizing element, balance titanium. The beta eutectoid element is at least one of Cu, Ni, Cr, Er, Y, Ce, Si, B or C. The beta isomorphous stabilizing element is Nb or a mixture of Nb with Ta, Mo or V, wherein the Nb can be replaced by Ta, Mo or V up to about half of the stated quantity.

The presently preferred amounts of the beta eutectoid stabilizing elements are as follows: Cu, Ni or Cr, about 4.50 to 12.0 a/o; Si, B or C, about 0.70 to 5.0 a/o; Er, Y or Ce, about 0.05 to 0.25 a/o.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISPERSION STRENGTHENED TRI-TITANIUM ALUMINUM ALLOY

RIGHTS OF THE GOVERNMENT

The invention described herein may be manufactured and used by or for the Government of the United States for all governmental purposes without the payment of any royalty.

BACKGROUND OF THE INVENTION

This invention relates to tri-titanium aluminide alloys.

Titanium alloys have found wide use in gas turbines in recent years because of their combination of high strength and low density, but generally, their use has been limited to below 600° C. due to inadequate strength and oxidation properties. At higher temperatures, relatively dense iron, nickel, and cobalt base super-alloys have been used. However, lightweight alloys are still most desirable, as they inherently reduce stresses when used in rotating components.

While major work was performed in the 1950's and 1960's on lightweight titanium alloys for higher temperature use, none has proved suitable for engineering application. To be useful at higher temperature, titanium alloys need the proper combination of properties. In this combination are properties such as high ductility, tensile strength, fracture toughness. elastic modulus, resistance to creep, fatigue, oxidation, and low density. Unless the material has the proper combination, it will fail, and thereby be use-limited. Furthermore, the alloys must be metallurgically stable in use and be amenable to fabrication, as by casting and forging. Basically, useful high temperature titanium alloys must at least out perform those metals they are to replace in some respect, and equal them in all other respects. This criterion imposes many restraints and alloy improvements of the prior art once thought to be useful are, on closer examination, found not to be so. Typical nickel base alloys which might be replaced by a titanium alloy are INCO 718 or INCO 713.

Heretofore, a favored combination of elements for higher temperature strength has been titanium with aluminum. In particular alloys derived from the intermetallic compounds or ordered alloys $Ti_3Al$ (alpha-2) and TiAl (gamma). Laboratory work in the 1950's indicated these titanium aluminide alloys had the potential for high temperature use to about 1000° C. But subsequent engineering experience with such alloys was that, while they had the requisite high temperature strength, they had little or no ductility at room and moderate temperatures. i.e. from 20° to 550° C. Materials which are too brittle cannot be readily fabricated, nor can they withstand infrequent but inevitable minor service damage without cracking and subsequent failure. They are not useful engineering materials to replace other base alloys.

There are two basic ordered titanium aluminum intermetallic compounds of interest. Ti3Al and TiAl, which could serve as a base for new high temperature alloys. Those well skilled recognize that there is a substantial difference between the two ordered intermetallic compounds. Alloying and transformational behavior of $Ti_3Al$ resemble those of titanium as the hexagonal crystal structures are very similar. However, the compound TiAl has a tetragonal arrangement of atoms and thus rather different alloying characteristics. Such a distinction is often not recognized in the earlier literature.

Therefore, the discussion hereafter is largely restricted to that pertinent to the invention, which is within the $Ti_3Al$ alpha-2 phase realm. i.e. about 75Ti-25Al atomically and about 86Ti-14Al by weight.

With respect to the early titanium alloy work during the 1950's, several U.S. and foreign patents were issued. Among them were Jaffee U.S. Pat. No. 2,880,087, which disclosed alloys with 8–34 weight percent aluminum with additions of 0.5 to 5% beta stabilizing elements (Mo, V, Nb, Ta, Mn, Cr, Fe, W, Co, Ni, Cu, Si, and Be). The effects of the various elements were distinguished to some extent. For example, vanadium from 0.5–5.0% was said to be useful for imparting room temperature tensile ductility, up to 2% elongation, in an alloy having 8–10% aluminum. But with the higher aluminum content alloys, those closest to the gamma TiAl alloy, ductility was essentially non-existent for any addition.

During the 1960's and 1970's considerable work was done by and for the United States Air Force covering the Ti-Al-Nb system. In U.S. Pat. No. 4,292,077, "Titanium Alloys of the $Tl_3Al$ Type", Blackburn and Smith identify 24–27 atomic percent aluminum and 11–16 atomic percent niobium as the preferred composition range. High aluminum increases strength but hurts ductility. High niobium increases ductility but hurts high temperature strength Vanadium is identified as being able to be substituted for niobium, up to about 4 atomic percent.

In U.S. Pat. No. 4,788,035, "Tri-Titanium Aluminide Base Alloys of Improved Strength and Ductility", Gigliotti and Marquardt disclose a $Tl_3Al$ base composition having increased tensile strength, ductility and rupture life due to the addition of Ta, Nb and V.

Nb alone has been used as a principal beta phase promoter in $Ti_3Al$. As noted previously, V can be substituted for Nb up to about 4 atomic percent. We found that rapidly solidified $Ti_3Al$ alloy containing 12 atomic percent Nb was somewhat ductile at room temperature due to its alpha-2 plus beta-2 structure. However, the alloy became brittle after exposure above 750° C. due to conversion of the beta-2 to alpha-2. The application of $Ti_3Al$-based alloys has been hindered by processing difficulties using ingot metallurgy (IM) because of the higher hot working temperature, poor hot workability and lower diffusivities as compared to existing titanium alloys.

Titanium alloys containing less than about 10 atomic percent Al can be dispersion strengthened by the addition of dispersion strengthening elements such as Cu, Ni, Cr, Si, B, C, Y and rare earth elements of the Lanthanide series, such as Ce and Er. Unfortunately, in Ti alloys containing about 20 to 30 atomic percent Al, these dispersion strengthening elements tend to segregate, even on rapid solidification. This is due to the limited solubility of these elements in the alpha-2 structure of $Ti_3Al$. Such segregation leads to brittle, non-homogeneous structures.

Accordingly, it is an object of the present invention to provide an homogeneous. dispersion-strengthened tri-titanium aluminum alloy.

Other objects and advantages of the present invention will become more apparent from the following description of the invention.

DESCRIPTION OF THE PREFERRED EMBODIMENT

In accordance with the present invention there is provided a titanium alloy comprising about 15 to 25 atomic percent (a/o) aluminum, about 0.05 to 12 a/o of at least one beta eutectoid stabilizing element and about 4 to 12 a/o of at least one beta isomorphous stabilizing element, balance titanium. The beta eutectoid element is at least one of Cu, Ni, Cr. Er, Y, Ce, Si, B or C. The beta isomorphous stabilizing element is Nb or a mixture of Nb with Ta, Mo or V, wherein the Nb can be replaced by Ta, Mo or V up to about half of the stated quantity.

The presently preferred amounts of the beta eutectoid stabilizing elements are as follows: Cu, Ni or Cr, about 4.50 to 12.0 a/o; Si, B or C, about 0.70 to 5.0 a/o; Er. Y or Ce. about 0.05 to 0.25 a/o.

The preferred embodiment herein is described in terms of atomic percents (a/o) as this is the manner in which it was conceived and is generally understood. Those skilled in the art can readily convert from atomic percents to exact weight percents for particular alloys.

While alloys containing Ti, Al, Cu and Nb have been known previously, they did not have ductility at lower temperatures as well as being usable at temperatures of 600° C. and above. The compositional ranges revealed herein are quite narrow, as the properties are more critically dependent on the precise composition than was known heretofore.

It is presently preferred that the alloys of this invention be prepared using a rapid solidification (RS) technique, particularly when one or more dispersion strengthening component is incorporated therein. Several techniques are known for producing rapidly-solidified foil. including those known in the art as Chill Block Melt Spinning (CBMS), planar Flow Casting (PFC), melt drag (MD), Crucible Melt Extraction (CME), Melt Overflow (MO) and Pendant Drop Melt Extraction (PDME). Typically, these techniques employ a cooling rate of about $10^5$ to $10^7$ deg-K/sec and produce a material about 10 to 100 micrometers thick, with an average beta grain size of about 2 to 20 microns, which is substantially smaller than the beta grain produced by ingot metallurgy methods.

The rapidly solidified material can be consolidated in a suitable mold to form sheetstock, bar-stock or net shape articles such as turbine vanes. Consolidation is accomplished by the application of heat and pressure over a period of time. Consolidation is carried out at a temperature of about 0° to 250° C. (0° to 450° F.) below the beta transus temperature of the alloy. The pressure required for consolidation ranges from about 35 to about 300 MPa (about 5 to 40 Ksi) and the time for consolidation ranges from about 15 minutes to 24 hours or more. Consolidation under these conditions permits retention of the fine grain size of the rapidly solidified alloy.

The following example illustrates the invention:

EXAMPLE

A series of alloys were prepared having the compositions shown in Table I, below.

TABLE I

| ALLOY | Composition (weight %) |
|---|---|
| A | Ti-15.5 Al-7.3 Cu |
| B | Ti-15.2 Al-14.4 Cu |
| C | Ti-14.8 Al-7 Cu-10.1 Nb |

The compositions shown in Table I were vacuum arc melted using high purity raw materials. Cigar shaped melts, weighing about 150 g, were homogenized at 1000° C. for 7 days. These alloys were converted to rapidly solidified fibers about 0.05 to 0.1 mm thick and about 0.5 to 1.5 mm wide, by Pendant Drop Melt Extraction in vacuum using a water-cooled copper wheel with a surface velocity of 880 m/min. For light microscopy, SEM/EDS analysis and microhardness measurements, more than 30 short transverse cross-sections of samples of each alloy were examined. Ductility was semi-quantitatively evaluated by observing slip lines around indentations under Nomarskii differential interference contrast and by 180° wrap-bend-test over a 3 mm mandrel.

The crystal structures of the chill and top surfaces were separately determined by X-ray diffractometry with crystal monochromatic Cu radiation. Thin foils for STEM analysis were prepared by double jet electropolishing. Microstructual analysis was done using JEOL 100CX and JEOL 2000 FX microscopes.

It was found that the microstructures of alloys A and B were neither consistent nor homogeneous. The Cu content of alloy A ranged from 5.0 to 18%, while Cu segregation in alloy B ranged from 14.7 to 76.7%. In contrast, in alloy C, the Cu was homogeneously distributed with a maximum variation of 0.5%.

The results of microhardness and bend ductility tests are shown in Table II, below:

TABLE II

| | Microhardness and Ductility | | |
|---|---|---|---|
| | Hardness | Ductility | |
| Alloy | $KH_{100\,g}$ | Slip Lines | Bend |
| A | 540 ± 25 | none | failed |
| B | 650 ± 30 | none | failed |
| C | 585 ± 25 | slight | pass/fail 0.2 |

Additionally, alloy B exhibited brittleness as indicated by splintering around the hardness impressions.

Various modifications may be made to the invention as described without departing from the spirit of the invention or the scope of the appended claims.

We claim:

1. A titanium alloy comprising about 15 to 25 atomic percent aluminum, about 0.05 to 12 atomic percent of at least one beta eutectoid stabilizing element selected from the group consisting of Cu, Ni, Cr, Er, Y, Ce, Si, B and C, and about 4 to 12 a/o of at least one beta isomorphous stabilizing element selected from the group consisting of Nb or a mixture of Nb with Ta, Mo or V, balance titanium.

2. The alloy of claim 1 containing about 4.50 to 12.0 atomic percent Cu, Ni or Cr.

3. The alloy of claim 1 containing about 0.70 to 5.0 atomic percent Si. B or C.

4. The alloy of claim 1 containing about 0.05 to 0.25 atomic percent Er, Y or Ce.

5. The alloy of claim 1 having the composition Ti-14.8Al-7Cu-10.1 Nb, by weight.

* * * * *